United States Patent [19]

Huber

[11] Patent Number: 5,768,235

[45] Date of Patent: Jun. 16, 1998

[54] CONTROL SIGNAL FOR RECORDING A DISC ACCORDING TO A CLOCK SIGNAL, DATA SIGNAL, AND AN INDEX SIGNAL

[75] Inventor: Gary D. Huber, Shoreview, Minn.

[73] Assignee: Imation Corp., Oakdale, Minn.

[21] Appl. No.: 727,149

[22] Filed: Oct. 8, 1996

[51] Int. Cl.[6] .................................................. G11B 7/00
[52] U.S. Cl. .............................. 369/59; 369/60; 369/58
[58] Field of Search ............................... 369/60, 32, 59, 369/47, 48, 58, 50; 360/51

[56] References Cited

U.S. PATENT DOCUMENTS

| | | | |
|---|---|---|---|
| 3,503,059 | 3/1970 | Ambrico | 360/51 |
| 4,019,153 | 4/1977 | Cox, Jr. et al. | 328/133 |
| 4,066,978 | 1/1978 | Cox, Jr. et al. | 328/133 |
| 4,167,761 | 9/1979 | Best | 360/45 |
| 4,202,017 | 5/1980 | Geffon et al. | 360/45 |
| 4,231,071 | 10/1980 | Anderson | 360/40 |
| 4,534,044 | 8/1985 | Funke et al. | 375/120 |
| 4,780,893 | 10/1988 | Henkelman, Jr. | 375/120 |
| 4,837,781 | 6/1989 | Hickling | 375/81 |
| 4,901,035 | 2/1990 | Cleveland | 331/14 |
| 4,975,930 | 12/1990 | Shaw | 375/120 |
| 5,040,165 | 8/1991 | Taii et al. | 369/275.4 |
| 5,057,794 | 10/1991 | Shih | 331/17 |
| 5,119,363 | 6/1992 | Satoh et al. | 369/50 |
| 5,216,657 | 6/1993 | Nishiuchi et al. | 369/60 |
| 5,272,730 | 12/1993 | Clark | 375/120 |
| 5,406,539 | 4/1995 | Paens et al. | 369/59 |
| 5,608,697 | 3/1997 | De Haan et al. | 369/58 |
| 5,615,195 | 3/1997 | Tanizawa | 369/60 |

FOREIGN PATENT DOCUMENTS

| | | |
|---|---|---|
| 298447 | 4/1995 | European Pat. Off. . |
| 0 660 314 A1 | 6/1995 | European Pat. Off. . |
| 411525 | 10/1995 | European Pat. Off. . |
| 2007248 | 1/1990 | Japan . |
| 5135412 | 6/1993 | Japan . |

*Primary Examiner*—Nabil Hindi
*Attorney, Agent, or Firm*—Eric D. Levinson

[57] ABSTRACT

A circuit arrangement modulates a disc-recording control signal as a function of data collected before and after an input data pulse and of the index signal of the recording disc. The circuit arrangement includes a tracking circuit, a timing control circuit, a programmable digital circuit, and a data output circuit. The tracking circuit monitors the index signal and provides a disc-location signal indicative of the disc recording zone. The timing control circuit clocks in the data signal and, in response thereto, generates a delayed pulse edge control signal. The programmable digital circuit responds to the disc-location signal and the timing control circuit by generating a level-setting digital signal and a delay setting digital signal for the timing control circuit. These signals are preselected as a function of the disc recording zone and the data in the input data signal. The data output circuit responds to the level-setting digital signal and the pulse edge control signal by generating the disc-recording control signal.

20 Claims, 5 Drawing Sheets

CONTROL SIGNAL FOR RECORDING A DISC ACCORDING TO A CLOCK SIGNAL, DATA SIGNAL, AND AN INDEX SIGNAL

FIELD OF THE INVENTION

The present invention relates to the practice of recording digital data and, more particularly, to circuit arrangements implemented to modify a stream of data before the data is used to manufacture a digital data recording.

BACKGROUND OF THE INVENTION

Digital data recordings are becoming increasingly popular. Recently, optical data discs have become the medium of choice for the distribution and accessing of large volumes of data. These data include audio and video program material, as well as computer programs and data. Optical data discs include, for example, audio compact discs (also known as audio CDs), CD-ROMs, video disks, and various types of magneto-optical discs.

Optical discs are generally produced by making a master that has data features or patterns representing the data formed in or on a reference surface therein. The master is used to make a stamper that, in turn, is used to make production quantities of replicate discs, each containing the data formed in the master. Typically, the manufacture of an optical data disc involves presenting the data to be inscribed onto the master disc from another recording medium to a control circuit that controls the application of the features in accordance with a data-recording standard.

In the construction of conventional CDs, for example, data features are implemented as a series of spaced pits located along a spiral track. The pit lengths and the distances between pits define the recorded digital data. Because the creation of these features define the accuracy of the recorded data on not only the master disc but also each replicate disc, CD manufacturers have made efforts to ensure that these features are created with precision. Where the features are implemented as pits on an optical CD, for example, much effort has been directed to the use of electronic circuits for controlling the laser beam recorder during the data recording process. The goal of such efforts has been to compensate for various conditions present during the recording process that degrade the consistency of the pits. These conditions include information before and after the data to be recorded, and the radial position of the laser beam during the recording process. Control circuits have been described as altering the activation timing of the radiation beam, the intensity of the beam itself, or both, to account for these conditions. While the desired compensation has been realized to a certain degree, significant improvement is still needed for many applications.

SUMMARY OF THE INVENTION

According to the present invention, a circuit arrangement and method provide a disc-recording control signal in response to a clock signal, a data signal, and an index signal. A tracking circuit is configured and arranged to respond to the index signal by providing a disc-location signal, and a control circuit is configured and arranged to respond to the clock signal and data from the data signal by generating the disc-recording control signal as a function of the disc-location signal and data collected before and after a reference point in the data stream.

In one embodiment, the control circuit includes a programmable digital circuit, which responds to the disc-location signal, for generating a programmed digital signal corresponding to a magnitude that is preselected as a function of the disc location at which the data is to be recorded.

According to another aspect of the present invention, a conventional pin driver circuit is used to amplitude modulate a timing pulse signal. Such a conventional circuit typically includes a first input port for receiving the input data signal and at least one other input port for setting the voltage boundaries of the circuit's output signal. The method is directed to providing an amplitude control circuit, for example, as part of the above-discussed output circuitry.

Another aspect of the present invention is directed to a method for providing an analog disc-recording control signal in response to a clock signal, an index signal and a time-based data signal. The method includes: providing a digital memory circuit with a multitude of data entries, with each data entry corresponding to a data output magnitude; generating a series of memory address signals, with each memory address signal generated as a function of the time-based data signal over a span beginning before and ending after a data-reference point and of the index signal; at an output of the digital memory circuit and in response to the memory address signals, generating a sequence of the data entries; and generating the analog disc-recording control signal as a function of the sequence of generated data entries.

The above summary of the present invention is not intended to describe each illustrated embodiment or implementation of the present invention. This is the purpose of the figures and the detailed description which follows.

BRIEF DESCRIPTION OF THE DRAWINGS

Other aspects and advantages of the present invention will become apparent upon reading the following detailed description and upon reference to the drawings in which.

While the invention is susceptible to various modifications and alternative forms, specific embodiments thereof have been shown by way of example in the drawings and will herein be described in detail. It should be understood, however, that it is not intended to limit the invention to the particular forms disclosed. On the contrary, the intention is to cover all modifications, equivalents, and alternatives falling within the spirit and scope of the invention as defined by the appended claims.

DETAILED DESCRIPTION OF THE ILLUSTRATED EMBODIMENTS

The present invention is generally applicable to recording data on various types of recording media. The present invention has been found to be particularly advantageous for use in recording data on an optical compact disc, wherein a data source circuit provides a data input signal along with clock and index input signals. While the present invention is not so limited, an appreciation of the invention is best understood through this context of optical compact discs.

Figure 1:
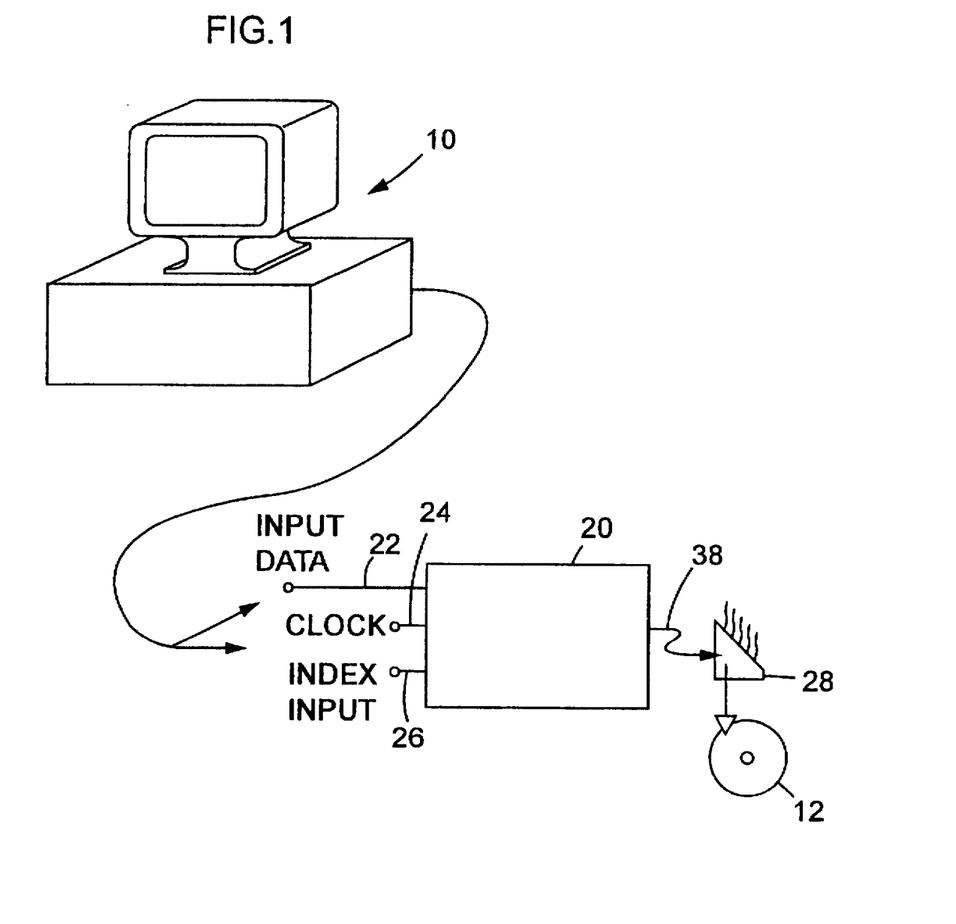
FIG. 1 is a perspective illustration of a system, implemented in accordance with the present invention, for recording data on carrier used to manufacture an optically-readable disc.

Turning now to the drawings, FIG. 1 illustrates an arrangement in which an information processing unit 10 is used in the manufacture of an optically-readable digital data carrier 12. Once created, the carrier 12 is processed and then used to manufacture a master disc, depicted as 14 in FIG. 2, using any of a number of known techniques. For example, the master disc 14 may be constructed using a standard CD-production glass substrate having a read surface upon which a coating of photo-resist is applied. Data to be recorded on the master disc 14 is sent from the information processing unit 10 to a recording pulse modulation circuit 20, which is constructed in accordance with the present invention. The data is sent from the information processing unit 10 in conventional form, which includes an input data signal at lead 22, and a synchronous clock signal at lead 24. An index input signal at lead 26 is provided as a feed back signal for the purpose of identifying the recording zone. The circuit 20 is used to modulate and control an input signal to a radiation source 28, such as an ODME Laser Beam Recorder. Under such control, the radiation source 28 breaches selected areas of the resist coating to form a series of disc features in the form of pits along a concentric or spiral track in the carrier 12.

Figure 2:
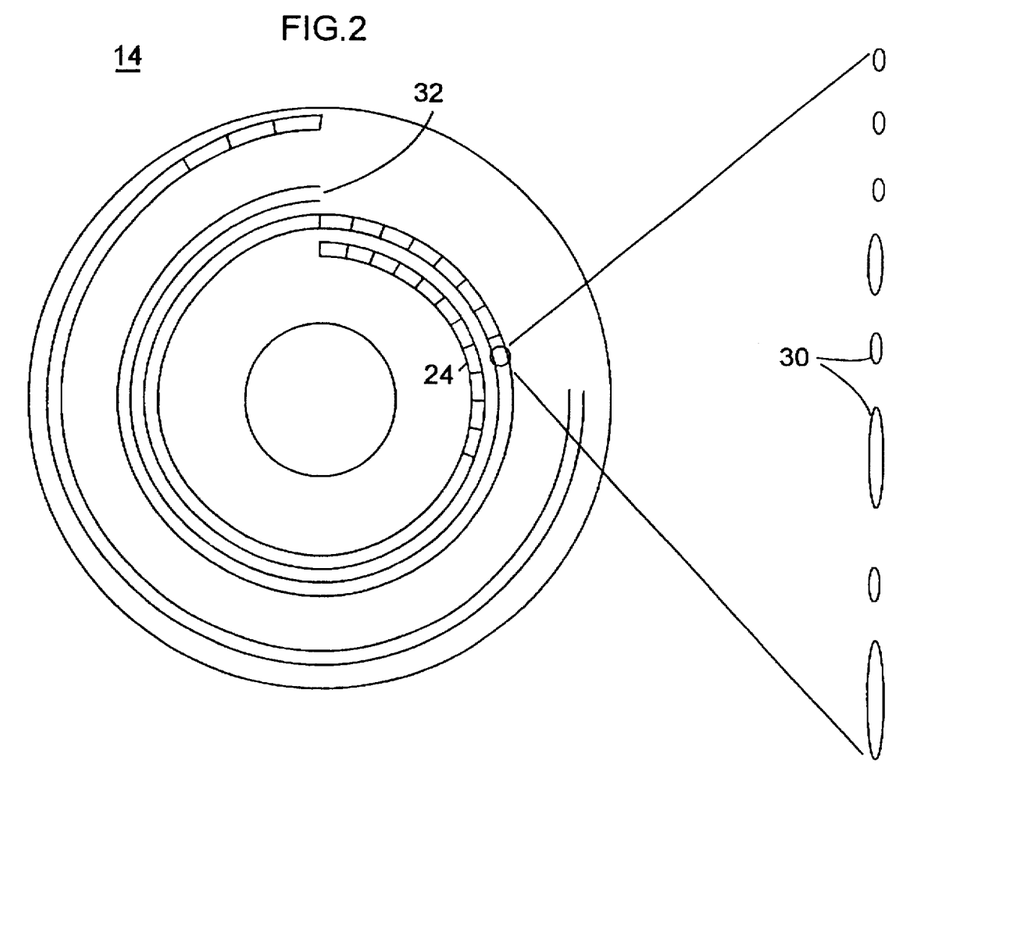
FIG. 2 is a top view of an optically-readable disc, manufactured in accordance with the present invention, with a portion of the disc shown in expanded form.

Further development of the breached photoresist structure leads to metal deposition and electroforming processes for the purpose of creating a metal "father" having a face molded from the breached photoresist. Using the metal "father", a mating metal "mother" is formed using substantially the same process but with the metal "father" replacing the breached photoresist/glass structure. These formed devices are then used to create metal stampers, which are in turn used in a number of CD-ROM plastic disc molders for producing CD-ROM discs which replicate the master disc 14 of FIG. 2. In FIG. 2, the disc features, which are exemplified in the form of pits 30 along one of a multitude of concentric tracks 32, define the digital data recorded on the master disc 14.

Figure 3:
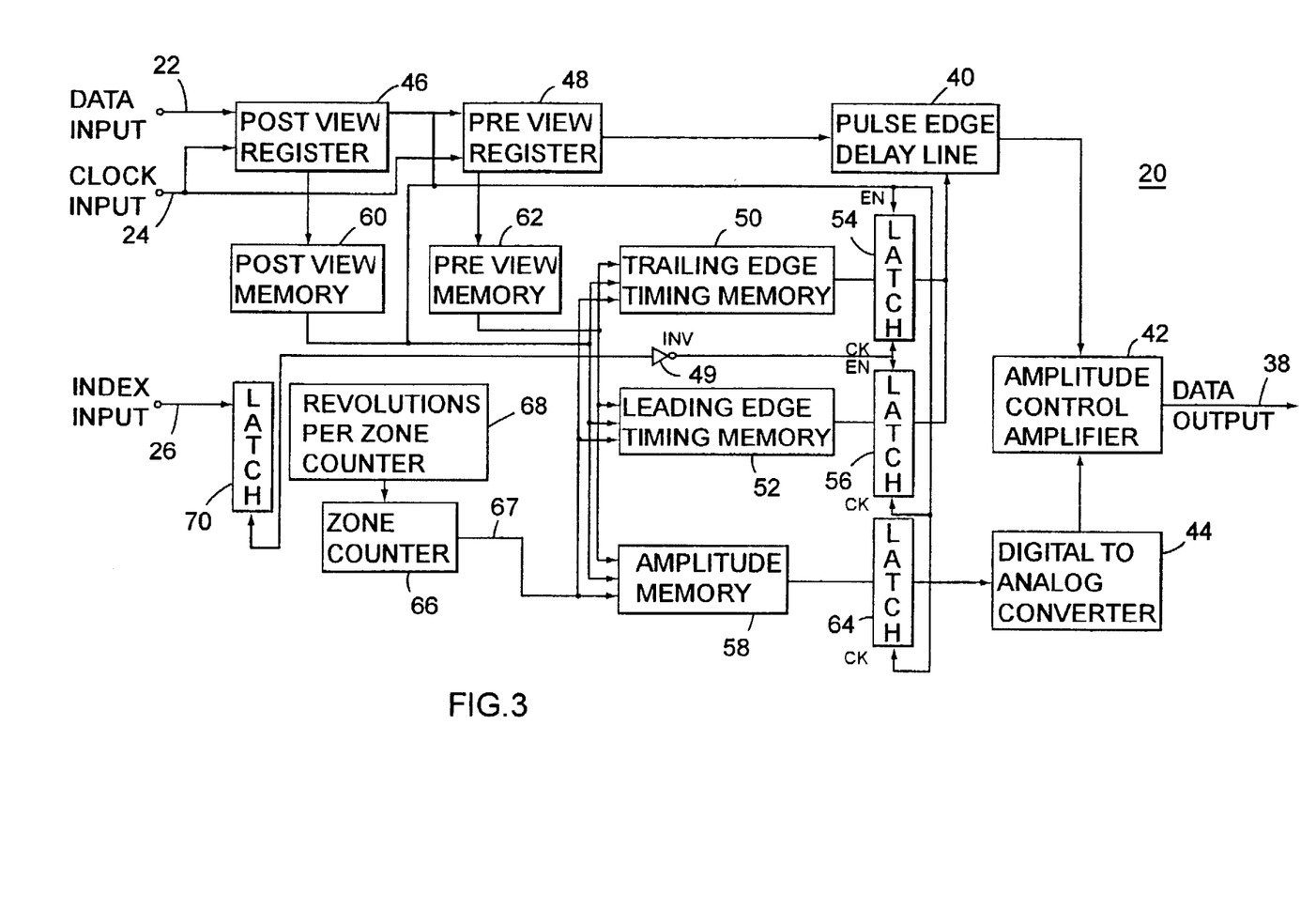
FIG. 3 is a block diagram illustrating the electrical construction of a circuit, in accordance with the present invention, for providing a controlling input to a radiation source device used in the manufacture of the carrier of FIG. 1.

Referring now to FIG. 3, the circuit 20 of FIG. 1 is shown in schematic block diagram form. As illustrated to the left of FIG. 3 and as previously discussed in connection with FIG. 1, the inputs to the circuit include an input data signal at lead 22, a clock signal at lead 24, and an index input signal at lead 26. The circuit 20 includes, among other circuitry, timing control circuitry, output circuitry and a number of memory modules. The memory modules are programmed to provide digital timing and amplitude control to the output circuitry for pulse timing and amplitude modulation of the input signal. The pulse timing and amplitude modulation of the input signal is ultimately provided by the output at lead 38.

The timing control circuitry includes a pulse edge delay line circuit 40 that responds to the data input and, in accordance with the timing of the clock input, produces a pulse as one of the inputs of an amplitude control circuit or amplifier 42. The other input of the amplitude control amplifier 42, provided by a digital to analog converter 44 such as an AD9713-type part, is an analog signal having an amplitude that effectively modulates the signal output from the pulse edge delay line circuit 40. The amplitude control amplifier provides a disc-recording control signal at output lead 38 (FIGS. 1 and 3). The disc-recording control signal is then transmitted to a radiation source device, which is used to record the data on the selected medium. Recognizing that the circuit 42 can be implemented using a variety of circuit types, one advantageous specific implementation of the amplitude control amplifier 42 is illustrated and described in connection with FIG. 5.

The pulse edge delay line circuit 40 can be implemented using conventional data delay circuitry, such as a PDU-18F-1 type delay circuit, available from Data Delay Devices, Inc. of Clifton, N.J. Using this type of delay circuit, the data input signal at lead 22 is passed through a pair of serial shift registers, depicted in FIG. 3 as post view register 46 and preview register 48, and then serially shifted to the data input port of the pulse edge delay line circuit 40. The delay provided by the pulse edge delay line circuit 40 is established using preprogrammed digital entries in trailing edge timing memory 50 and leading edge timing memory 52. The memories 50 and 52 are selectively addressed, based on an analysis of the data before and after a reference point in the serial data stream of the data input signal at lead 22 and a disc-location signal at lead 67, to output the correct entries for delaying the serially-fed input to the pulse edge delay line circuit 40. Latch circuits 54 and 56 are alternately clocked and enabled by the data signal edges at the time they are fed from the post view register 46 to the preview register 48. An inverter, depicted by reference numeral 49, permits this alternate control by clocking an entry into and enabling the latch circuit 54 on a data negative edge transition and clocking an entry into and enabling the latch circuit 56 on a data positive edge transition for outputting to the delay line circuit 40. Each of the memories 50 and 52, as well as memories 58, 60, and 62, can be implemented using conventional 32K×8 RAM type parts. In an application needing program changes, each of the memories 50, 52, 58, 60, and 62 can be implemented using dual-port static RAMs with one port configured for data processing as shown in FIG. 3 and the other port configured for access by an external bus for computer-controlled set up and programming. Using a conventional personal computer, for example, control over each of these memories, as well as counters 66 and 68, is automated using, for example, conventional PC-ISA interfacing. In this specific implementation, the PC-ISA bus is used to clear a D-type flip-flop having its D input pulled high and its clock input connected to receive the index input signal at lead 26. This arrangement permits setting the Q-output of the flip-flop high, which is connected to the load enable port of the counter 68 for pre-recording initialization. In this manner, the entire circuit arrangement of FIG. 3 is implemented on a single plug-in card for incorporation into the information processing unit or computer (e.g., 10 of FIG. 1).

The input to the digital to analog converter 44 is presented by a latch circuit 64, with the latch circuit 64 always being enabled and with entries being clocked into the latch circuit 64 by the same clock signal which clocks the entries into the latch circuit 56 at a positive edge transition. The input to the latch circuit 64 is provided by an amplitude memory 58, which is selectively addressed, based on an analysis of the data before and after a reference point in the serial data stream of the data input signal at lead 22, to output the correct entry for controlling the amplitude of the analog signal provided by the digital to analog converter 44.

The analysis of the data before and after the reference point is provided using a table of predetermined entries or codes representing the data pulse and space pattern. The circuit 20 of FIG. 3 is configured with the reference point being the leading edge of the data when this edge is clocked from the postview register 46 to the preview register 48.

Using this configuration, the data before the reference point in the serial data stream of the data input signal is processed by the preview memory 62. The preview memory 62 receives a data word, as shifted into the preview register 48, as a portion of the data signal immediately before the data reference point. The postview memory 60 receives a data word, shifted into the postview register 46, as a portion of the data signal immediately after the data reference point.

Using a snapshot of this data which surrounds the data reference point as two 15-bit addresses for the respective memories 60 and 62, these memories 60 and 62 provide an eight-bit address (four bits from each of the memories 60 and 62) from a table of predetermined entries preprogrammed therein. The eight-bit address is used to address the table of predetermined entries in the memories 50 and 52 for setting the delay in the delay line circuit 40, and to address the table of predetermined entries in the memory 58 for setting the amplitude via the input to the digital to analog converter 44.

The tracking circuitry, which includes a zone counter 66, responds to the index signal to provide the disc-location signal at lead 67 to memories 50, 52, and 58. The disc-location signal is indicative of the zone where data is being recorded on the selected medium, e.g., the carrier 12 of FIG. 1. The index signal, which is conventionally provided using a sensor configured to monitor the rotation of the selected medium, is processed by a counter 68 via a latch circuit 70.

In one particular embodiment, the counter 68 is implemented in the form of a sixteen-bit countdown counter initially preset to a count value which corresponds to a programmed number of revolutions comprising a zone on the selected medium. In one application, the presetting of the counter 68 is fixed for a particular disc type. For applications which require a varying number of revolutions per zone, the presetting of the counter 68 can be programmably varied, for example, using the PC-ISA bus interface, by latching the programmed data at the inputs to the counter 68, such as a 74F269, via a 74ALS990 type latch. In either application, the counter 68 decrements each time it receives a pulse carried by the index signal. Assuming that these pulses are received at a rate of one pulse per disc revolution, the counter 68 counts the revolutions of the carrier (12 of FIG. 1) for making the master disc (14 of FIG. 2). Upon decrementing to zero, the counter 68 resets to the initial count value and provides a pulse to the counter 66. In one specific embodiment, the counter 66 is implemented as a 74F269-type counter that increments or decrements each time it receives a pulse from the counter 68. The counter 66 thereby counts the number of reset events of the counter 68, thereby counting the zone at which the data is being recorded on the carrier. The counter 66 is preset to a 7-bit start-record zone number with direction of counting set by most significant bit (or 8th bit) (up=1 or down=0) according to whether the range of zones for recording is from highest to lowest or lowest to highest.

The latch circuit 70 is coupled between the index signal input at lead 26 and the counter 68, and it latches pulses carried by the index signal synchronously with the data edges. The pulses are clocked into the latch circuit 70 by the leading edge of the data reference point and presented to the counter 68.

According to a specific implementation, each of the timing memories 52 and 50 and the amplitude memory 58 is organized into 128 blocks of data, using one block per recording zone. Assuming 256 bytes per block for a 32k×8 memory circuit, each of these memories 52, 50 and 58 includes block 0 through block 127 addressed, for example, by address lines (using hexidecimal notation) 50000–57FFF, 60000–67FFF and 70000–77FFF, respectively. Using this addressing arrangement and the same type of notation, the memories 52, 50 and 58 are addressed using the entries programmed into the postview and preview memories 46 and 48, as follows:

TABLE 1

| POSTVIEW MEM (60) ADDR (HEX) | PREVIEW MEM (62) ADDR (HEX) | CONTENTS (HEX) | |
|---|---|---|---|
| 40000 | 48000 | 4*F** | |
| 40001 | 48001 | 4E | |
| 40002–40003 | 48002–48003 | 4D | |
| 40004–40007 | 48004–48007 | 4C | |
| 40008–4000F | 48008–4800F | 4B | |
| 40010–4001F | 48010–4801F | 4A | |
| 40020–4003F | 48020–4803F | 49 | |
| 40040–4007F | 48040–4807F | 48 | |
| 40080–400FF | 48080–480FF | 47 | |
| 40100–401FF | 48100–481FF | 46 | |
| 40200–403FF | 48200–483FF | 45 | |
| 40400–407FF | 48400–487FF | 44 | |
| 40800–40FFF | 48800–48FFF | 03 | space- |
| 41000–41FFF | 49000–49FFF | 02 | width |
| 42000–43FFF | 4A000–4BFFF | 01 | ↑ |
| 44000–45FFF | 4C000–4DFFF | 01 | ↓ |
| 46000–46FFF | 4E000–4EFFF | 02 | pulse- |
| 47000–470FF | 4F000–4F0FF | 13 | width |
| 47100–477FF | 4F100–4F7FF | 03 | |
| 47800–47BFF | 4F800–4FBFF | 04 | |
| 47C00–47DFF | 4FC00–4FDFF | 05 | |
| 47E00–47EFF | 4FE00–4FEFF | 06 | |
| 47F00–47F7F | 4FF00–4FF7F | 07 | |
| 47F80–47FBF | 4FF80–4FFBF | 08 | |
| 47FC0–47FDF | 4FFC0–4FFDF | 09 | |
| 47FE0–47FEF | 4FFE0–4FFEF | 0A | |
| 47FF0–47FF7 | 4FFF0–4FFF7 | 0B | |
| 47FF8–47FFB | 4FFF8–4FFFB | 0C | |
| 47FFC–47FFD | 4FFFC–4FFFD | 0D | |
| 47FFE | 4FFFE | 0E | |
| 47FFF | 4FFFF | 0F | |

In the above table, the pulsewidths and spacewidths are recorded on the right side of the "Contents" column, below and above the mid-level horizontal line, respectively. They are in units of clock period, that is, "T" equals one clock period. The left side of the "Contents" column provides one of three possible amplitude codes: 0001, 0100, or 0101. These codes are represented in hexidecimal notation as "1" or "4", with each indicating the environment in which the space before the input pulse is greater than 3T ("4") and the space after the input pulse is greater than 3T ("1"). Where each of the respective spaces before and after the input pulse is greater than 3T, this is indicated as a 0101 (or hex "5") by effectively adding the corresponding bits from each of the preview and postview memories.

For the specific exemplary implementation described above in which each of the memories 52, 50 and 58 is organized into 128 blocks of data with 256 bytes per block, the timing and amplitude control provided by the leading and trailing edge timing memories 50, 52 and 58 and the amplitude memory can be exemplified using an input data pulse that has a particular duration and that is targeted for a particular location block, or zone, as addressed by the zone counter 66. For this specific example and for each of these memories, each block of memory is accessed as a 16-row by 16-column array. For each of the memories 50, 52 and 58, each of the 16 columns corresponds to the input pulse width, which can range from 0 to 15T.

The leading and trailing edge control provided from timing memories 52 and 50 is determined as a function of the pulse length, and one of sixteen patterns of fifteen bits before the leading edge, or after the trailing edge, of the input data pulse. For the leading edge timing memory 52, each of the 16 rows corresponds to the space width before the input pulse, as addressed by the four least significant bits output from the preview memory 62. Each of the 16 columns is addressed by the four least significant bits output from the postview memory 60. For the trailing edge timing memory 50, each of the 16 rows corresponds to the space width after the input data pulse, as addressed by the four least significant bits output from the postview memory 60. Each of the 16 columns corresponding to the pulse width is addressed by the four least significant bits output from the preview memory 62. The range of the possible spaces and pulses is assumed to be from 0 to 15T.

For a 2T long input pulse, for example, the delay is therefore obtained by accessing the entry programmed at the appropriate row for the 2T column in the leading edge timing memory 52 and the entry programmed at the appropriate row for the 2T column in the trailing edge timing memory 50.

The entries programmed into each of the columns for each of the leading and trailing edge timing memories 52 and 50 are referenced from an empirically-determined nominal leading edge delay ("NLET") and an empirically-determined nominal trailing edge delay ("NTET"), respectively. Using the 2T input pulse for the particular zone as an example, the 2T column of the array in the leading edge timing memory 52 is programmed with a delay code corresponding to $W_2$ for prespace widths of zero through 3T and with a delay code corresponding to $X_2$ for prespace widths of more than 3T, where:

$$W_2 = NLET + \Delta T1,$$

and $$X_2 = NLET\ 30\ \Delta T2,\ \text{with}\ \Delta T1 > \Delta T2.$$

The 2T column of the array in the trailing edge timing memory 50 is programmed with a delay code corresponding to $Y_2$ for postspace widths of zero through 3T and with a delay code corresponding to $Z_2$ for postspace widths of more than 3T, where:

$$Y_2 = NTET - \Delta T1,$$

and $$Z_2 = NTET - \Delta T2,\ \text{with}\ \Delta T1\ 22\ \Delta T2.$$

For the amplitude memory 58, each of the 16 columns is addressed by the four least significant bits output from the postview memory 60. Each of the 16 rows corresponds to the space width before and the space width after the input pulse width. This is implemented using the fifth and sixth least significant bits output from the postview memory 60 to address the two least significant bits for the rows. The other two bits for the row address are provided from the fifth and sixth least significant bits output from the preview memory 62. In this manner, the amplitude control for a particular zone is determined by the pulse length, one of four patterns of fifteen bits ahead of the leading edge of the input pulse, and one of four patterns of (fifteen - pulse width) bits after the trailing edge of the input pulse.

The digital amplitude control provided to the digital-to-analog converter 44 for input pulses ranging in length from 1T through 15T for one particular zone, or block, is implemented, for example, with reference to an empirically-determined nominal amplitude ("NAMP"). Using the left side of the "Contents" column of Table 1, where one of three possible amplitude codes: 0001, 0100, or 0101 is presented as address bits to the amplitude memory at a particular zone, an adjustment is made to the nominal amplitude, NAMP. With amplitude code 0001 representing the space after the trailing edge of the input pulse being greater than 3T, the second of the sixteen rows (row 0001) is programmed with $S_n$, where n corresponds to the input pulsewidth and the column of the array for the addressed block or zone (n being equal to any number from 0 through 15). In the instance that the amplitude code is 0100, representing that the space before the leading edge of the input pulse is greater than 3T, the fourth of the sixteen rows (row 0100) is also programmed with the amplitude modifier code $S_n$. In the instance that the amplitude code is 0100 for the space before the leading edge and 0001 for the space after the leading edge, the fifth of the sixteen rows (row 0101) is programmed with the amplitude modifier code $T_n$. These amplitude modifier codes are as follows:

$$S_n = NAMP + \Delta AMP1 + F(1/n),$$

and $$T_n = NAMP + \Delta AMP2 + F(1/n),$$

where $\Delta AMP2 > \Delta AMP1$, n is the input pulsewidth, and each of $\Delta AMP1$, $\Delta AMP2$ and $F(1/n)$ is empirically determined for the target recording environment and application. Thus, using the above equations, larger spaces around the input pulse lead to a greater amplitude, which in turn results in a larger pit.

Accordingly, this specific implementation provides for up to 128 recording zones and, therefore, readily accommodates several typically-sized zoned recording applications.

Figure 4:
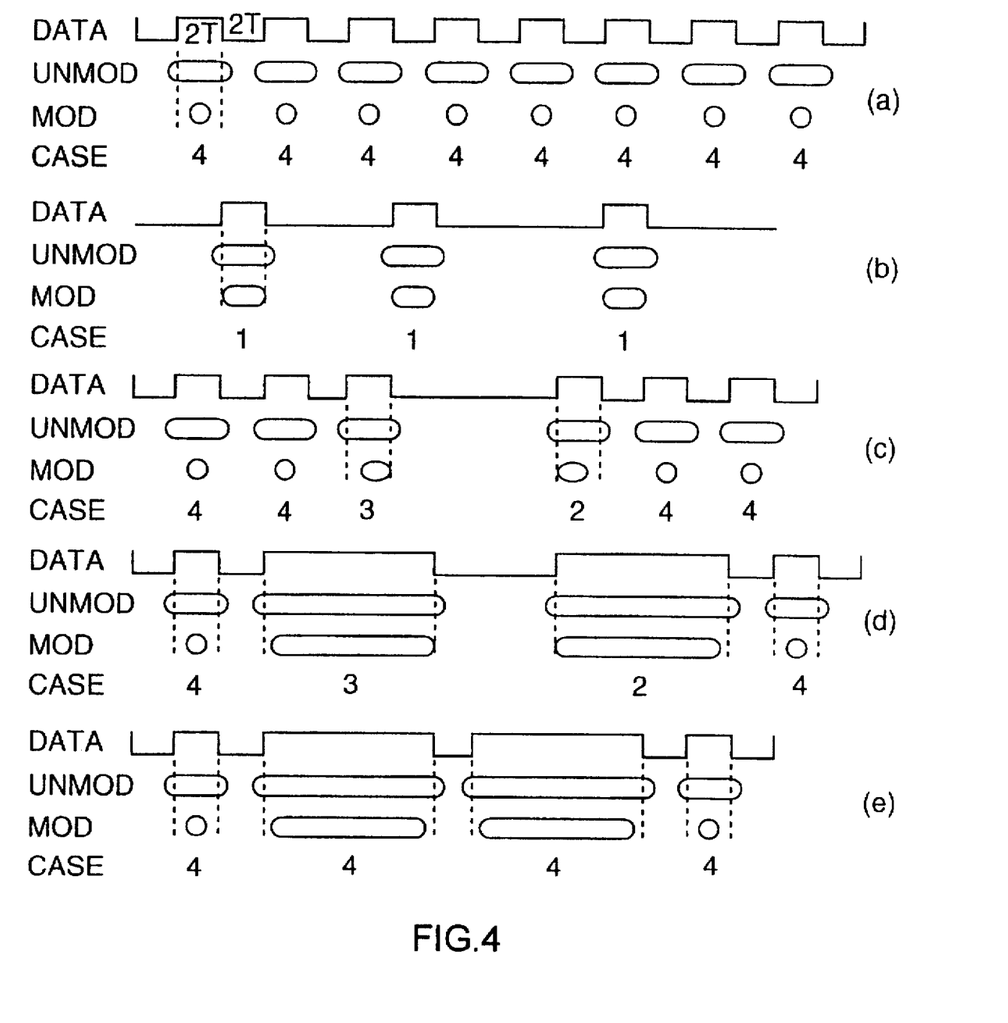
FIG. 4, (a)–(e) comprises a series of timing diagrams illustrating recorded features with timing and amplitude modulation in accordance with the present invention, and without this timing and amplitude modulation.

FIG. 4 diagrams how pits are formed, in accordance with the present invention, in response to various streams of data as viewed at the data input lead (22 of FIG. 3). For each of these data streams (a) through (e), "T" represents the period of one cycle of the clock input (at lead 24 of FIG. 3). The data features immediately below the corresponding data stream, implemented as a pit or a land, represent a recording without the timing and amplitude modulation provided by the circuit 20 of FIG. 3. The next row of data features illustrate the recording of the same data stream through use of the timing and amplitude modulation provided by the circuit 20 of FIG. 3.

Referring to the first illustration (a), the data stream is composed of data pulses and spaces therebetween each having a 2T, or two cycle, pulse/space width. The data features shown immediately below each pulse are excessive in terms of length. The requisite maximum width is indicated by the vertical dotted lines. The data features shown next, produced in accordance with the present invention, represent the same data but the recorded features are well within the requisite boundaries.

In the second illustration (b) of FIG. 4, the data stream is composed of three data pulses each having a 2T width, and spaces therebetween each having at least a 4T space width. The length of the data features shown immediately below each pulse are excessive, as indicated by the vertical dotted lines. The data features shown as a product of the circuit 20 of FIG. 3 are within the requisite boundaries.

In the third illustration (c) of FIG. 4, the data stream is composed of two series of three data pulses, again with each pulse having a 2T width. The spaces therebetween are of varying width, namely, 2T, 2T, 8T, 2T and 2T (from left to right as the data would be read from the carrier/disc). The length of the data features shown immediately below each pulse are excessive, exactly as shown for the pulses in the first illustration (a). While the data features shown as a product of the circuit 20 of FIG. 3 are within the requisite boundaries, the space width of 8T elongates the data features, corresponding to the adjacent pulses, in a direction toward the space having the 8T width. This elongation is required to adjust for the amplitude effects that the 8T space has on the adjacent pit features during reading of the disc.

The next two illustrations, (d) and (e), similarly show the improvement provided by the circuit 20 of FIG. 3 for data streams having pulses which are longer than 2T.

The reference numeral ("1", "2", "3" or "4") directly below each pulse in each of the above five illustrations is used to identify the timing algorithm for determining the digitally-implemented delay for the input to the delay line circuit (40 FIG. 3).

Where the pulse is underscored by "4", the pulse length "nT" has a 2T length space (or space) before the leading edge and after the trailing edge of the pulse being examined. In accordance with the present invention, the leading edge delay for the pulse nT is increased by a factor of ΔT1 with respect to a nominal value, and the trailing edge delay for the same pulse nT is decreased by the same amount. The nominal value is a value that yields an output that is equal in length to a corresponding input pulse.

Where the pulse is underscored by "1", the pulse length "nT" has a space length of at least 4T before the leading edge and after the trailing edge of the pulse being examined. In accordance with the present invention, the leading edge delay for the pulse nT is increased by a factor of ΔT2 which is less than ΔT1 with respect to the nominal value, and the trailing edge delay for the same pulse nT is decreased by the same amount.

Where the pulse is underscored by "3", the pulse length "nT" has a space length of 2T before the leading edge and a space length of at least 4T after the trailing edge of the pulse being examined. In accordance with the present invention, the leading edge delay for the pulse nT is increased by a factor of ΔT1 and the trailing edge delay for the pulse nT is decreased by a factor of ΔT2, both with respect to both with respect to the nominal value.

Where the pulse is underscored by "2", the pulse length "nT" has a space length of at least 4T before the leading edge and a space length of 2T after the trailing edge of the pulse being examined. In accordance with the present invention, the leading edge delay for the pulse nT is increased by a factor of ΔT2 and the trailing edge delay for the pulse nT is decreased by a factor of ΔT1, as similarly discussed in connection with the above examples.

For each pulse identified in FIG. 4 above, the amplitude is set via the determined entries in the amplitude memory (58 of FIG. 3) as function of both the pulse length and the recording zone. In instances where the recording zone would not impact the amplitude, the pulse amplitude is varied inversely proportional to the pulse length nT. Where the recording zone does impact the amplitude, such as in constant angular velocity (CAV) recording, the pulse amplitude is varied directly proportional to the radial dimension corresponding to the recording zone from zone to zone, and inversely proportional to the pulse width within a zone. These above-described functions of pulse amplitude versus pulse width and recording zone are illustrative of only one particular set of functions programmed into the memories. Other functions, such as empirically-determined positive and negative proportionality constants and slope-defining constants can also be included depending on the specific application and implementation.

Figure 5:
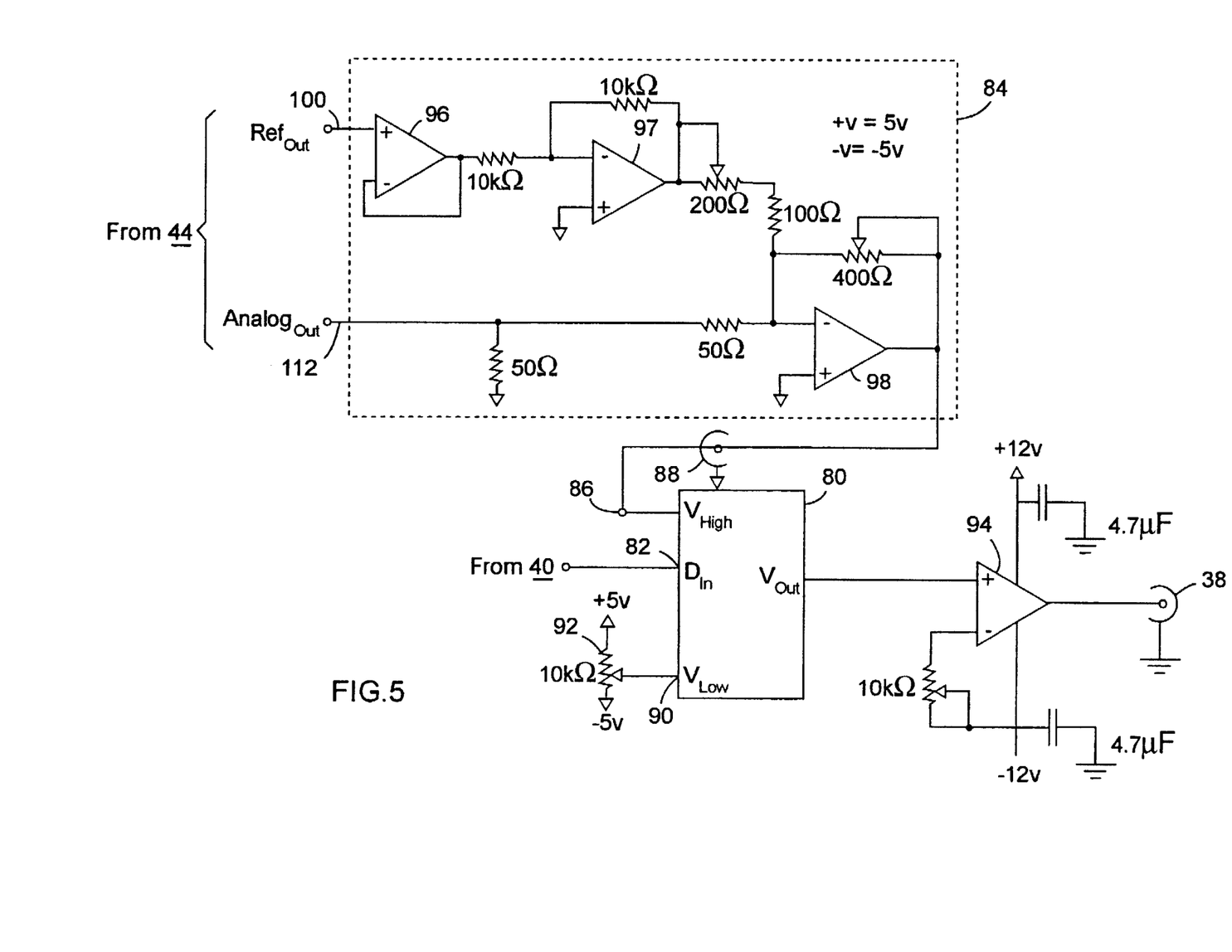
FIG. 5 is a more detailed illustration showing one manner, according to the present invention, for implementing the portion of the circuit that is directly coupled to the output of the circuit of FIG. 3.

FIG. 5 details one implementation of the amplitude control amplifier circuit 42. The circuit 42 includes a pin driver circuit 80, such as a HFA5250 part available from Harris Corp., coupled via a conventional current-to-voltage converter 84 at lead 86 to the digital to analog converter 44. The HFA5250 includes one input port for receiving an input signal and two other input ports for receiving and setting the voltage boundaries of the circuit's output signal.

According to the present invention, this circuit 80 is used as part of the above-discussed output circuitry. The data input port 82 is coupled to receive a timing pulse from the delay line circuit 40. The upper input port 88 is coupled to receive an analog level-indicating signal from the digital to analog converter 44, via the current-to-voltage converter circuit 84, so as to amplitude modulate the timing pulse provided from delay line circuit 40. The lower input port 90 is coupled to receive a voltage reference signal from a potentiometer 92, which sets this input to about zero volts. The output of the circuit 80 is provided to a conventional unity-gain current buffer amplifier circuit 94, which may be implemented using a LH0063 type part.

The inputs 100 and 102 to the converter 84 are, in this embodiment, provided from the reference voltage and the analog data outputs 100 and 102 of an AD9713 type digital to analog converter part (depicted as 44 in FIG. 3).

Except for changes reflected in the current to voltage converter 84 of FIG. 5, the converter 84 is implemented substantially as shown at page 3-270 of Design-In Reference Manual, 1994, available from Analog Devices, Inc., using a pair of AD708 type operational amplifiers 96 and 97 feeding an AD9617 operational amplifier 98 with negative feedback.

Accordingly, the present invention provides, among other aspects, a circuit and method for controlling a data recorder with timing and amplitude preselected as a function of the data surrounding the data to be recorded. In instances where the data is to be recorded on a disc, such as an optically-readable CD, the timing and amplitude can also be selected as a function of the radial location for the disc recording.

Other embodiments of the present invention will be apparent to those skilled in the art from consideration of the specification and practice of the invention disclosed herein. It is intended that the specification and illustrated embodiments be considered as exemplary only, with a true scope and spirit of the invention being indicated by the following claims.

What is claimed is:

1. A circuit arrangement for providing a disc-recording control signal in response to a clock signal, a data signal, and an index signal, the circuit arrangement comprising:

a tracking circuit configured and arranged to respond to the index signal and to the clock signal by providing a disc-location signal;

a timing control circuit configured and arranged to receive the clock signal and data from the data signal and, in response thereto, to generate a pulse edge control signal;

a programmable digital circuit, responsive to the disc-location signal and the timing control circuit, for generating a programmed digital signal corresponding to a magnitude which is preselected as a function of the disc location at which the data is to be recorded; and a data output circuit configured and arranged to respond to the programmed digital signal and the pulse edge control signal by generating the disc-recording control signal.

2. A circuit arrangement, according to claim 1, wherein the tracking circuit is further configured and arranged to respond to the index signal by counting signals carried by the index signal.

3. A circuit arrangement, according to claim 2, wherein the tracking circuit is further configured and arranged to respond to the index signal by latching the signals carried by the index signal at intervals defined by the data signal and wherein the signals carried by the index signal are counted to track the number of revolutions per disc.

4. A circuit arrangement, according to claim 1, wherein the programmable digital circuit includes a plurality of memory modules.

5. A circuit arrangement, according to claim 4, wherein the plurality of memory modules is preprogrammed with a lookup table which is addressed as a function of the disc-location signal.

6. A circuit arrangement, according to claim 1, wherein the programmable digital circuit includes an addressable lookup table which is addressed as a function of the disc-location signal and of the data from the data signal.

7. A circuit arrangement, according to claim 1, wherein the timing control circuit is further configured and arranged to generate the pulse edge control signal in response to data received before a data-reference point and data received after the data-reference point.

8. A circuit arrangement, according to claim 7, wherein the timing control circuit provides a delay in response to the programmable digital circuit, the delay being predetermined as a function of the data received before the data-reference point and data received after the data-reference point.

9. A circuit arrangement, according to claim 1, further including a data-memory circuit configured and arranged to respond to the timing control circuit by storing segments of the data received before and after a data-reference point.

10. A circuit arrangement, according to claim 9, wherein the disc-recording control signal includes a plurality of output pulses representative of input pulses on the data signal, the width of each output pulse being a function of the width of the input pulses and at least some of the data received before and after the data-reference point.

11. A circuit arrangement, according to claim 1, wherein the data output circuit includes an amplifier circuit which generates the disc-recording control signal in response to an analog representation of a digital word and to the pulse edge control signal.

12. A circuit arrangement for providing a disc-recording control signal in response to a data signal, and an index signal, the circuit arrangement comprising:

a timing control circuit configured and arranged to receive selected data information beginning before and ending after a data-reference point in the data signal, and to generate a pulse edge control signal in response to a first preprogrammed digital signal;

a memory addressing circuit configured and arranged to generate memory addressing signals in response to the selected data information and the index signal;

a programmable digital circuit, responsive to the memory addressing signals, configured and arranged to generate the first preprogrammed digital signal which is predetermined as a function of the selected data information and to generate a second preprogrammed digital signal which is predetermined as a function of the index signal; and a data output circuit configured and arranged to respond to the pulse edge control signal and to the second preprogrammed digital signal by generating the disc-recording control signal.

13. A circuit arrangement for providing a disc-recording control signal, according to claim 12, wherein the timing control circuit is responsive to the data signal and a clock signal which is synchronized to the data signal.

14. A circuit arrangement for providing a disc-recording control signal, according to claim 12, wherein the programmable digital circuit includes a plurality of memory modules.

15. A circuit arrangement for providing a disc-recording control signal, according to claim 14, wherein the memory addressing circuit includes a counter circuit.

16. A circuit arrangement for providing a disc-recording control signal, according to claim 14, wherein the data output circuit includes a signal mixing circuit which is configured to respond to an analog signal and a digital signal.

17. A circuit arrangement for providing a disc-recording control signal, according to claim 16, wherein the data output circuit includes an amplifier circuit configured to generate the disc-recording control signal in analog form.

18. A circuit arrangement for providing a disc-recording signal, according to claim 16, wherein the timing control circuit generates the pulse as control signal in response to both the first programmed digital signal and the second programmed digital signal.

19. A circuit arrangement for providing a disc-recording control signal in response to a clock signal, a data signal, and an index signal, the circuit arrangement comprising:

a tracking circuit configured and arranged to respond to the index signal by providing a disc-location signal; and a control circuit configured and arranged to store selected data information starting before and ending after a data reference point in the data signal and, in response thereto, to generate the disc-recording control signal as a function of the disc-location signal and the selected data information.

20. A circuit arrangement for providing a disc-recording control signal, according to claim 19, wherein the control circuit includes a programmable digital circuit, responsive to the disc-location signal.

* * * * *